# 3,051,696
CHROMATION OF AZO DYES
William Dettwyler, Hockessin, Del., assignor to E. I. du Pont de Nemours and Company, Wilmington, Del., a corporation of Delaware
No Drawing. Filed Mar. 23, 1960, Ser. No. 16,958
9 Claims. (Cl. 260—147)

This invention relates to an improved process for the manufacture of 1:2 chromium azo dye complexes, a class of dyes used to color wool and nylon fibers from a neutral dye bath.

By 1:2 chromium azo dye complexes are meant complex compounds which contain one chromium atom and two azo bridges per molecule. Contrasted to these are the 1:1 chromium azo compounds, which possess but one chromium atom per azo bridge and which are generally employed as acid colors for wool.

Both types of complexes may be prepared by reacting, o,o'-dihydroxy azo dyes in aqueous or organic liquid medium with trivalent chromium compounds such as chromic chlorides or sulfates or with compounds of hexavalent chromium such as alkali-metal dichromates. Of all these reagents and media, sodium or potassium dichromate and an aqueous reaction mass are, obviously, the most economical from the viewpoint of cost of initial materials. This combination, however, has two important drawbacks. Unless means are provided for reducing the dichromate, either prior to reaction or within the reaction mass, to a trivalent chromium compound, or unless a large excess of the dichromate is used, the reaction is very slow, and may require as much as 16 hours for completion, depending on the chromable azo dye employed. On the other hand, an excess of the trivalent chromium tends to produce the 1:1 complex as a by-product, thereby contaminating the principal product.

It is accordingly an object of this invention to improve the process of producing 1:2 chromium azo dyes by reacting four moles of the same or different o,o'-dihydroxy-azo dyes with one mole of an alkali-metal dichromate or other convenient water-soluble, hexavalent, inorganic Cr compound for instance chromium trioxide or an alkali-metal monochromate, whereby to enable the process to be carried out in aqueous medium, within a reasonably short time, while yet permitting the presence of considerable excesses of the chromium compound without danger of degrading the reaction product by contamination with 1:1 chromium azo complexes. Additional objects and achievements of this invention will appear as the description proceeds.

My solution to the above problem, according to this invention, is based on the surprising discovery that water-soluble alkanolamines, when added to the reaction mass, have the good quality of accelerating the reaction of o,o'-dihydroxy-azo dyes with water-soluble, hexavalent chromium compounds in aqueous medium and of somehow directing the reaction whereby to discourage formation of the by-product 1:1 chromium azo complex.

I do not fully understand the theory of action of said alkanolamines or the reasons for their mentioned beneficial influences, but I find that the hexavalent chromium compound in excess of that required to produce the 1:2 complex (0.5 Cr atom per mole of chromable azo dye) is not reduced to a trivalent chromium compound, and that the aforementioned beneficial effects are obtained regardless of the nature of the azo dye (or dyes) employed in the reaction. Thus I find that the azo dye starting material may be a single color (in which event four moles of the azo dye are employed per mole of the dichromate or two moles per mole of chromate and the result is a symmetrical 1:2 chromium azo dye), or it may be an equimolecular mixture of two different azo dyes (in which event four moles, total, of the mixture are employed with a dichromate, or two moles total in the case of a chromate, and the product is statistically a mixture, the bulk of which is an unsymmetrical 1:2 chromium azo dye).

In either event, o,o'-dihydroxy monoazo dyes or pairs of such dyes may be used, whether water-soluble or not. Expressed in a different manner, the formula of the dye (or dyes) may be

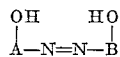

wherein A is the nucleus of an o-hydroxy aromatic amine of the benzene or naphthalene series, while B is the nucleus of a coupling component which possesses a hydroxy group or an enolizable keto group. For instance, B may be a hydroxy aromatic amine of the benzene, naphthalene or quinoline series, or it may be an aryl-methyl-pyrazolone compound, or it may be an acetoacetic ester or an acetoacetanilide. Furthermore, either A or B or both may be further substituted by common azo dye substituents, such as sulfo, carboxy, halogen, nitro, alkoxy, amino, alkylamino, arylamino, aralkylamino, acylamido, and sulfamoyl.

If the azo dye is not water-soluble, an aqueous slurry thereof may be employed for the reaction.

As alkali-metal dichromate, sodium dichromate is naturally less costly, but potassium dichromate, sodium or potassium chromate and chromium trioxide are also suitable.

I find that any water-soluble alkanolamine may be employed, but to insure water solubility, the alkylene radical or radicals of the molecule should preferably contain no more than 4 C-atoms each. Accordingly, the alkanolamines applicable in this invention may generally be defined by the formula $H_yN$—$(alkOH)_x$, wherein alk is an alkylene radical of 2 to 4 C-atoms, $x$ is a numeral not less than 1 and not greater than 3, and $y=3-x$. Typical illustrations of alkanolamines defined by the above formula are monoethanolamine, diethanolamine, triethanolamine, monoisobutanolamine, triisopropanolamine, and the various other commercially available mono-, di- and trialkanolamines in which the alkanol portions contain from 2 to 4 C-atoms in a straight or branched chain.

However, alkanolamines derived from alkylene diamines are also excellently suitable. Such compounds may be expressed by the general formula

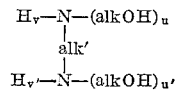

wherein alk and alk' designate alkylene radicals of 2 to 4 C-atoms, $u$ and $u'$ designate numerals not less than 1 and not greater than 2, while $v=2-u$ and $v'=2-u'$. As typical examples of this class may be mentioned N,N,N',N'-tetrakis(2-hydroxyethyl)ethylenediamine and the commercially available "Quadrol," which is N,N,N',N'-tetrakis(2-hydroxypropyl)ethylenediamine represented by the formula

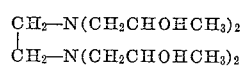

Ordinarily, 3 to 6 moles of the alkanolamine per mole of azo dye will achieve the desired results in the shortest reaction time. Larger quantities are not harmful, but are superfluous. Lower quantities, say 2 moles per mole of azo dye, will operate but the reaction is slower.

The initial azo compound (or compounds) may be taken from storage in dry form, or the chromium compound and alkanolamine (and second azo dye, if needed) may be entered directly into the aqueous coupling bath in which the azo dye (or one of the azo dyes) is produced.

The temperature of chromation is preferably the reflux temperature of the aqueous reaction mass obtained, and will therefore be in the vicinity of 98° to 102° C. However, higher temperatures under pressure may be employed if desired, and lower temperatures, say 80° C., are operative but, of course, slower.

If carried out at reflux, the reaction is generally complete in less than 8 hours, more often in 2 or 3 hours, and may in some cases be as short as 30 minutes.

Without limiting this invention, the following examples are given to illustrate my preferred mode of operation. Parts mentioned are by weight.

EXAMPLE 1

(a) 20 parts of the azo compound obtained by coupling diazotized 2-amino-1-phenol-4-sulfonamide to 3-methyl-1-phenyl-5-pyrazolone were slurried in 200 parts of water. 4.2 parts of sodium dichromate ($Na_2Cr_2O_7 \cdot 2H_2O$) and 10 parts of monoethanolamine were added and the reaction mass was heated at reflux temperature for 3 hours. The 1:2 chromium azo dye complex went into solution as it was formed and complete solution was obtained. A slight excess of dichromate was present at the end of the heating period. The color was partially salted out cold using sodium chloride; the precipitation was then completed by adding hydrochloric acid to partially neutralize the ethanolamine, and the metallized dye was filtered off in excellent yield and purity. This dye colors wool and nylon from a neutral to weakly acidic dye bath in red-orange shades having good fastness properties.

(b) When part (a) of this example was repeated except that 32 parts of ethanolamine and 16 parts of sodium dichromate were employed, the metallization was completed in one hour, providing the same dye in excellent yield and purity.

When the procedures of this example are repeated except omitting the alkanolamine and making the reaction mass alkaline with sodium hydroxide, the resulting dye is weaker.

EXAMPLE 2

The process of Example 1(a) was repeated except that 37 parts of the metallizable azo dye in 500 parts of water, 9 parts of sodium dichromate and an alkanolamine, shown in the table below, were employed. The metallizations were completed in the times shown. The dye of Example 1 was obtained in excellent yield and purity in each instance.

*Table I*

| Alkanolamine: | Time, hours |
|---|---|
| (a) Diethanolamine, 10 parts | 3 |
| (b) Triethanolamine, 10 parts | 1 |
| (c) Isobutanolamine, 15 parts | 4 |
| (d) Triisopropanolamine, 38 parts | 3 |
| (e) Tetraisopropanol-ethylenediamine (Quadrol), 25 parts | 0.5 |

EXAMPLE 3

5 parts of the azo dye obtained by coupling diazotized 2-amino-1-phenol-4-sulfonamide to 2-naphthol were heated at boiling temperature (about 101° C.) in 100 parts of water with 2.2 parts of sodium dichromate and 5 parts of ethanolamine until the formation of the 1:2 chromium azo dye complex was complete (4 hours). The final dye was isolated as described in Example 1(a) in good yield and quality. It is identical in dyeing properties with the dye prepared when the same starting materials are employed in the process described in Example 1 of U.S.P. 2,671,081 (Billings and Remington) wherein the chromation is performed in ethylene glycol at 140° to 160° C. using a trivalent chromium compound.

EXAMPLE 4

10 parts of the azo dye from 2-amino-1-phenol-4-sulfonamide and 1,3-isoquinolinediol were heated in 200 parts of water at reflux temperature with 4.1 parts of sodium dichromate and 8 parts of ethanolamine until chromation was complete (4 hours). The red dye obtained was identical in dyeing properties with the product made from these intermediates and following the ethylene glycol process described in Example 1 of U.S.P. 2,671,081.

EXAMPLE 5

18.8 parts of 2-amino-1-phenol-4-sulfonamide were suspended in 300 parts of water and 24 parts of acetic acid, and diazotized at 20° to 25° C. with 7 parts of sodium nitrite. The diazonium salt, as a partial suspension, was added rapidly at 25° C. into a solution of 18 parts of 3-methyl-1-phenyl-5-pyrazolone, dissolved in 500 parts of 10% aqueous sodium carbonate solution. The coupling was finished after stirring 1 hour at 25° to 28° C. Then 15 parts of sodium dichromate and 10 parts of ethanolamine were added and the whole was heated at reflux temperature until the 1:2 chromation reaction was complete (about 3 hours). After cooling the mass to room temperature, 200 parts of NaCl were added followed by 30 parts of 30% hydrochloric acid to partially neutraliaze the alkalinity. An excellent yield of the 1:2 chromium complex was isolated as described in Example 1(a), and the product was identical with the dye of that example.

EXAMPLE 6

A suspension in 100 parts of water of 8.2 parts of the monoazo dye obtained by coupling sodium 1-diazo-6-nitro-2-naphthol-4-sulfonate to 2-naphthol was heated with 3.3 parts of sodium dichromate and 6 parts of ethanolamine at reflux temperature for 2 hours, and the 1:2, chromium azo dye complex was isolated as described in Example 1(a). It dyed wool and nylon from a neutral to weakly acidic aqueous dye bath in black shades and the dyeings exhibited excellent light and wash fastness properties.

The process of this example was repeated, using equal molar amounts of the metallizable azo dyes obtained from the components listed in Table II.

*Table II*

| | Diazo Component | Coupling Component | Shade of 1:2 Chromium Complex |
|---|---|---|---|
| (a) | 2-amino-1-phenol-4-sulfonamide. | acetoacetanilide | Yellow. |
| (b) | ----do---- | acetoacetic ethyl ester | Do. |
| (c) | 2-amino-4-chlorophenol. | sodium 2-naphthol-6-sulfonate. | Violet. |
| (d) | ----do---- | acetoacetic ethyl ester | Yellow. |
| (e) | 2-amino-5-nitrophenol | sodium 1-naphthol-4-sulfonate. | Blue. |
| (f) | 2-amino-4-chlorophenol. | 3-methyl-1-(p-sulfophenyl)-5-pyrazolone, sodium salt. | Red. |
| (g) | 1-amino-2-naphtholsulfonic acid. | 5,8-dichloro-1-naphthol. | Blue. |

EXAMPLE 7

10 parts of the azo dye 2-amino-4-chlorophenol→3-methyl-1-phenyl-5-pyrazolone and 12.4 parts of the azo dye 2-amino-4-chlorophenol→3-methyl-1-(p-sulfophenyl)-5-pyrazolone were suspended in 250 parts of water, to which 5.2 parts of sodium dichromate and 9 parts of ethanolamine were added. The reaction mass was heated at reflux for 8 hours, at which time color formation was complete. The color was isolated as described in Example 1(a). It dyed wool and nylon in bright red shades having very good wash and light fastness.

The process of Example 7 was repeated, except that the two metallizable azo dyes used therein were replaced, respectively, by equal molar amounts of the two azo dyes (I and II) listed in Table III.

*Table III*

| | Azo Base I | Azo Base II | Shade |
|---|---|---|---|
| (a) | 2 - amino - 4 - chlorophenol → 3 - methyl-1 - phenyl - 5 - pyrazolone. | sodium 2 - aminophenol-4-sulfonate → 3 - methyl-1 - phenyl - 5 - pyrazolone. | Red. |
| (b) | 2 - amino - 5 - nitrophenol → sodium - 1 - naphthol - 4 - sulfonate. | 2 - amino - 1 - phenyl - 4 - sulfonamide → 3 - methyl-1 - phenyl - 5 - pyrazolone. | Brown. |
| (c) | 1 - diazo - 6 - nitro - 2 - naphthol - 4 - sulfonic acid→2-naphthol. | 1 - diazo - 2 - naphthol - 4 - sulfonic acid → 2-naphthol. | Black. |
| (d) | 2 - amino - 4 - chlorophenol→2-naphthol. | 2 - amino - 4 - chlorophenol → sodium 2 - naphthol-6-sulfonate. | Violet. |
| (e) | 2 - amino - 1 - phenol - 4 - sulfonamide → 2 - napthol. | 2 - amino - 1 - phenyl - 4 - sulfonamide → 3 - methyl - 1 - phenyl - 5 - pyrazolone. | Brown. |

EXAMPLE 8

50 parts of the azo dye, 2-amino-1-phenol-4-sulfonamide→3-methyl-1-phenyl-5-pyrazolone, were slurried in 500 parts of water, followed by the addition of 20 parts of sodium chromate tetrahydrate and 12.5 parts of monoethanolamine. The suspension was heated to reflux (101° C.) and agitated at that temperature for 2 hours. The reaction mass was then cooled to room temperature and 150 parts of sodium chloride and 5.8 parts of 10 N hydrochloric acid were added to completely precipitate the dye. The precipitate was filtered off, washed alkali-free with 25% sodium chloride solution, and dried. An excellent yield of the 1.2 chromium azo dye complex was obtained. It dyes wool and nylon from a neutral to weakly acidic aqueous dye bath in an orange shade which exhibits excellent fastness properties.

EXAMPLE 9

By replacing the sodium chromate of Example 8 with 8 parts of chromium trioxide ($CrO_3$), the reaction was completed after 1 hour at reflux temperature. The dye, isolated as in Example 8, exhibits shade, strength and fastness properties similar to those of the dye of that example.

EXAMPLE 10

50 parts of the azo dye defined in Example 8 were reacted in 500 parts of water with 10 parts of ethanolamine and 12 parts of ammonium chromate at the reflux temperature for 2 hours. The dye was isolated as in Example 8. It is similar to the dye of that example.

EXAMPLE 11

60 parts of the azo dye, 1-diazo-6-nitro-2-naphthol-4-sulfonic acid→2-naphthol, were suspended in 500 parts of water. 15 parts of sodium chromate tetrahydrate and 10 parts of monoethanolamine were added and the reaction mass was boiled for 2 hours to complete the chromation. The dye was salted out, filtered off, and dried. It dyes wool and nylon from a neutral to weakly acidic aqueous dye bath in a black shade having excellent fastness.

EXAMPLE 12

38 parts of 2-amino-1-phenol-4-sulfonamide were slurried in 300 parts of water and 24 parts of acetic acid at room temperature and diazotized at 24° to 26° C. with 13.8 parts of sodium nitrite. The diazo solution was added at 25° to 30° C. into an agitated solution of 14 parts of 2-naphthol and 18 parts of 3-methyl-1-phenyl-5-pyrazolone in 500 parts of water containing 10 parts of 30% sodium hydroxide and 50 parts of sodium carbonate. The coupling was complete after 1 hour. Then 12.5 parts of monoethanolamine and 11 parts of chromium trioxide were added and the reaction mass was heated to reflux. It was boiled for 4 hours, which was sufficient time to complete the chromation. The dye was salted out from the cold solution and filtered off. It dyes wool and nylon from a neutral to weakly acidic aqueous dye bath in a rich brown shade having excellent fastness.

EXAMPLE 13

42 parts of the azo dye, 2-amino-1-phenol-4-sulfonamide→2-naphthol, were boiled in a solution of 12.5 parts of ethanolamine and 7 parts of chromium trioxide in 500 parts of water for 4 hours. The cold dye suspension was filtered. The 1:2 chromium azo dye complex thus obtained dyes wool and nylon from a neutral aqueous dye bath in a violet shade having excellent fastness.

It will be understood that the details of the above examples may be varied widely without departing from the spirit of this invention. Thus, the amount of water, used as diluent for the reaction, is not critical; about 10 to 20 parts per part of metallizable dye are preferred. When materially more concentrated than this, the reaction mass becomes too thick. Larger dilutions become uneconomical. The preferred amount of alkanolamine is from 3 to 6 moles per mole of the azo dye starting material. When less then 3 moles of the alkanolamine are used the reaction rate is decreased. More than 6 moles are not harmful but are not needed.

One-fourth mole of dichromate, or one-half mole of a chromate or of chromium trioxide, per mole of metallizable azo dye is theory for the reaction to form the 1:2 complex. Less chromium will not afford complete reaction. Chromium in excess of the theoretical amount, say up to 300% excess, is beneficial in that the chromation is completed in less time when the larger amounts are used. In other words, the time of reaction decreases with increase of chromating agent from 0.5 Cr atom up to about 2 Cr. atoms; more is not harmful but is not needed.

The safety factor against over-chromation as provided by this invention, when excess of the hexavalent chromium compound is used, coupled with the increased speed of reaction, constitutes a most valuable practical advantage in the general process herein described.

I claim as my invention:

1. In the process of producing a 1:2 chromium-azo dye in substance by chromating an o,o-dihydroxymonoazo dye, the improvement which consists of applying as chromating agent a water-soluble inorganic compound of hexavalent chromium in quantity not less than theoretical based on the quantity of said monoazo dye, and effecting the chromation in an aqueous medium, at a temperature not less than 80° C., and in the presence of a water-soluble alkanolamine which possesses not more than 4 C-atoms in any of its alkyl radicals and which is present in quantity of not less than 2 moles per mole of said monoazo dye.

2. A process improvement as in claim 1, wherein the chromating agent employed is a member of the group consisting of chromium trioxide, the alkali-metal chromates and the alkali-metal dichromates.

3. A process improvement as in claim 1, wherein two different o,o'-dihydroxymonoazo dyes are employed in essentially equal molecular proportions.

4. A process improvement as in claim 1, wherein a single o,o-'dihydroxymonoazo dye is employed.

5. A process improvement as in claim 1, wherein the quantity of alkanolamine employed is from 3 to 6 moles per mole of initial azo dye.

6. A process improvement as in claim 1, wherein the alkanolamine employed is a compound of the formula $H_yN$—$(alkOH)_x$, wherein alk is an alkylene radical of 2 to 4 C-atoms, $x$ is a numeral not less than 1 and not greater than 3, and $y = 3 - x$.

7. A process improvement as in claim 1, wherein the alkanolamine employed is a compound of the formula

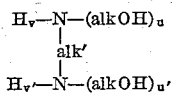

wherein alk and alk' designate alkylene radicals of 2 to 4 C-atoms, $u$ and $u'$ designate numerals not less than 1 and not greater than 2, while $v=2$, $u$ and $v'=2-u'$.

8. A process improvement as in claim 1, wherein the reaction is carried out at a temperature not exceeding the reflux temperature of the reaction mass.

9. In the process of producing a 1:2 chromium-azo dye in substance by chromating an o,o'-dihydroxymonoazo dye by the aid of a water-soluble dichromate in aqueous medium, the improvement which consists of effecting the chromation of each mole of said dye with at least 0.25 mole of a water-soluble dichromate in the presence of at least 2 moles of a water-soluble alkanolamine having not more than 4 C-atoms in any of its alkyl radicals, followed by isolation of the metallized dye by salting and filtration.

References Cited in the file of this patent

UNITED STATES PATENTS

| | | |
|---|---|---|
| 1,693,448 | Krzikalla et al. | Nov. 27, 1928 |
| 2,054,489 | Stusser | Sept. 15, 1936 |
| 2,353,411 | Miller | July 11, 1944 |
| 2,714,102 | Schetty | July 26, 1955 |
| 2,842,536 | Bauer et al. | July 8, 1958 |

FOREIGN PATENTS

| | | |
|---|---|---|
| 1,016,866 | Germany | Oct. 3, 1957 |
| 793,136 | Great Britain | Apr. 9, 1958 |